United States Patent Office 3,504,016
Patented Mar. 31, 1970

3,504,016
FLUORINATED POLYESTERS
Kenneth C. Smeltz, Graylyn Crest, Wilmington, Del., assignor to E. I. du Pont de Nemours and Company, Wilmington, Del., a corporation of Delaware
No Drawing. Original application July 26, 1967, Ser. No. 656,076. Divided and this application Feb. 28, 1969, Ser. No. 803,455
Int. Cl. C07c 69/76
U.S. Cl. 260—475                              5 Claims

ABSTRACT OF THE DISCLOSURE

Polyesters prepared by the condensation of perfluoroalkyl-terminated alkyl-1,3-propanediols of the formula $(R_f-R')_a CH_{2-a}(CH_2OH)_2$ with complementary dibasic acids including malonic acids of the formula $$(R_f-R')_a CH_{2-a}(COOR)_2$$

and, optionally, other diols; and polyesters prepared from such malonic acids and other diols. The polymers are in general useful as fabric coatings to impart oil- and water-repellency thereto.

CROSS REFERENCES TO RELATED APPLICATIONS

This application is a division of application Ser. No. 656,076, filed July 26, 1967.

BACKGROUND OF THE INVENTION (1) Field of the invention

This invention relates to polyesters derived from perfluoroalkyl-terminated alkyl derivatives of malonic acid, its esters and alcohols.

(2) Description of the prior art

Interest in the heat-resistant properties and the solvating powers of fluorinated organic compounds has led to increased activity in the preparation of various fluorine-containing organic materials. The preparation of such materials is, however, frequently difficult and expensive. For example, β-perfluoroalkyl glutaric acids have been prepared through a five-step procedure, while additional steps are necessary to prepare the corresponding 3-perfluoroalkyl-pentane-1,5-diol, and polymers thereof. Such preparations are described in U.S. Patent 3,016,361. However, it was not possible to produce, by the procedure described therein, perfluoroalkyl malonic acids and their derivatives nor polymers derived from them.

SUMMARY OF THE INVENTION

The invention is directed to condensation polymers prepared from perfluoroalkyl-terminated alkyl malonic acids or esters thereof represented by the structural formula (1)          $(R_f-R')_a CH_{2-a}(COOR)_2$ wherein $R_f$ is perfluoroalkyl of 4–20 carbons, $R'$ is alkylene of 2–12 carbons, R is hydrogen or lower alkyl, and A is the whole number 1 or 2, or perfluoroalkyl-terminated alkyl-1,3-propanediols represented by the structural formula (2)          $(R_f-R')_a CH_{2-a}(CH_2OH)_2$ wherein $R_f$, $R'$ and $a$ are defined as above. Thus the polymers of this invention include:

(a) Polyesters comprising the condensation product of at least one compound of Formula 2 and at least one organic dibasic acid. The dibasic acid is preferably either a saturated aliphatic dibasic acid of 2–18 carbons, or an aromatic dibasic acid of 8–18 carbons. The foregoing preferred dibasic acids can be represented by the formula $A(COOH)_2$, wherein A is the aliphatic or aromatic moiety. Preferably A is alkylene of 0–16 carbons, arylene of 6–16 carbon atoms or $(R_f-R')_a CH_{2-a}<$. Optionally, these polyesters can contain units derived from at least one nonhalogenated diol of the formula $D(OH)_2$ wherein D is a saturated aliphatic group of 2–28 carbon atoms and is most preferably alkylene of 2–18 carbon atoms. The molar ratio, in these latter polymers, of the diol of Formula 2 to the diol $D(OH)_2$ is at least 0.25 to 1; and (b) Polyesters comprising the condensation product of at least one compound of Formula 1 and at least one organic diol of the formula $E(OH)_2$, wherein E is defined the same as D, above, or is a specified halogenated organic diol.

The polymers described above are useful in rendering fabrics and metals oil- and water-repellent; and as films or fibers.

DESCRIPTION OF THE INVENTION (A) The malonic acid and ester monomers employed to prepare polymers of this invention.—As is seen from Formula 1, these derivatives are monosubstituted ($a$–1) or disubstituted ($a$–2) derivatives of malonic acid and its esters. The perfluoroalkyl group $R_f$ can be either straight chain or branched chain, and is defined herein as including cyclic perfluoroalkyl although these latter groups are less desirable because of their general unavailability. Preferably, $R_f$ contains 6–12 carbon atoms and is straight chained. Representative perfluoroalkyl groups include the perfluorinated groups derived from butyl, amyl, hexyl, heptyl, octyl, decyl, dodecyl, tetradecyl, hexadecyl, octadecyl, eicosyl, isoamyl, isoheptyl, cyclobutyl, cyclohexyl, methylcyclohexyl and the like. Of these, the groups hexyl to dodecyl are preferred.

The group $R'$ is preferably the divalent straight-chain group $(CH_2)_m$ where $m$ is 2–12, although it can be branched. Most preferably, $m$ is a cardinal number of 2–4. Representative $R'$ groups include ethylene, butylene, decylene and dodecylene. The R is represented by hydrogen, methyl, ethyl, propyl, butyl, tert.-butyl, hexyl and the like. The term "lower" as used herein is defined as a chain containing 1–6 carbon atoms.

The compounds of Formula 1 are prepared by reacting the starting material $CH_2(COOR'')_2$ where $R''$ is lower alkyl, with $R_f-R'-Z$ in the presence of a reagent capable of converting $CH_2(COOR'')_2$ to the anion $$[CH(COOR'')_2]^-$$

Z is a displaceable group and is preferably a carbonate, nitrate, halogen (chlorine, bromine or iodine), or arylene sulfonates, such as the toluene-sulfonate ester. The halogens and arylene sulfonates are preferred. A number of bases capable of forming the carbanion $[CH(COOR'')_2]^-$ are known. These include alkali metal alkoxides, such as sodium butoxide, potassium methoxide, and rubidium isopropoxide; alkali metal amides, sodium triphenylmethide, sodium hydride or sodium or potassium metal.

The reaction procedure is described generally by Cope, Holmes and House in Chapter 4, vol. 9, of "Organic Reactions," Wiley, 1957. Reaction pressure, amounts of ingredients and time of reaction are generally not critical. The reaction is preferably carried out employing an alkali metal alkoxide as the base, in which case the alcohol precursor of the alkoxide is used in excess as the solvent. Reaction temperatures are preferably reflux temperatures, and the reaction is carried out under substantially anhydrous conditions. When only one $(R_f-R')$ group is desired in the final product, any of the above-listed bases can be employed; but when two $(R_f-R')$ groups are desired, the stronger alkoxide bases such as sodium or potassium tert.-butoxide are preferred.

The initial products obtained by the reaction are the esters wherein R of Formula 1 is lower alkyl. The corresponding acids (wherein R of Formula 1 is hydrogen) are obtained by saponification of the ester.

The reactants employed in the process are readily available and are well known in the art, except for the $R_f$—R' arylsulfonate esters which are prepared from the well-known alcohols $R_f$—R'—OH by reaction with arylsulfonyl chlorides using the Schotten-Bauman technique in the presence of a base such as sodium hydroxide.

The malonic acid derivatives of Formula 1 are useful for preparing condensation polymers with the 1,3-propanediols described below.

(B) The 1,3-propanediol monomers employed to prepare polymers of this invention.—These compounds are represented by Formula 2 and are obtained by reducing a compound of Formula 1 to the corresponding diol of Formula 2. Hence, the discussion concerning the nature of $R_f$, R', R and $a$ in Section A immediately above is applicable to these propanediols.

The reduction of carboxyl or ester groups to primary alcohol groups is well known. Ester-containing compounds (those of Formula 1 wherein R is lower alkyl) are preferred as the starting material. Reduction reagents include hydrogen and catalysts, alkali metal aluminum hydrides or borohydrides, and the like. More specifically, when the compounds of Formula 1 where R is lower alkyl (the esters) are employed, the strong reducing conditions are preferred. Thus, such reducing agents as hydrogen and copper chrome oxide, lithium aluminum hydride, hydrogen and rhodium or ruthenium, or sodium and absolute alcohol, and the like, are preferred.

The reaction conditions will vary widely depending upon the reducing reagents used. These conditions are well known in the art, as for example, "Organic Reactions," vol. 6, Chapter 10, Wiley, 1951; Wagner and Zook, "Synthetic Organic Chemistry," Section 84, pp. 155–157, Wiley, 1953; and Gilman, "Organic Chemistry," 2nd ed., vol. 1, pp. 827–831, Wiley, 1949.

The 1,3-propanediols described in this Section B are useful in preparing condensation polymers.

(C) The polymers of this invention.—The polymers of this invention are derived from the monomer $(R_f—R')_aCH_{2-a}(COOH)_2$ and/or $(R_f—R')_aCH_{2-a}(CH_2OH)_2$ hence, the discussion in Section A above concerning $R_f$, R' and $a$ is applicable to the polymers of the invention.

(1) POLYESTERS DERIVED FROM
$(R_f—R')_aCH_{2-a}(CH_2OH)_2$
AND DIBASIC ACIDS

These polyesters are derived from the diols of Formula 2 and organic dibasic acids of the formula $A(COOH)_2$, wherein A is defined as above. The polymers may be formed just from the diol of Formula 2 and the acid $A(COOH)_2$, or they may be formed from said diol and acid and nonhalogenated diols of the formula $D(OH)_2$ wherein D is a saturated nonhalogenated aliphatic group of 2–28 carbons, and is preferably divalent alkylene of 2–12 carbons. The molar ratio of the diol of Formula 2 to the diol $(D(OH)_2$ is at least 0.25 to 1.

Preferably A is divalent alkylene, divalent arylene, oxygen-interrupted divalent alkylene or oxygen-interrupted divalent arylene. Most preferably A is divalent alkylene or arylene. Representative examples of diacids useful herein include oxalic, malonic, succinic, glutaric, adipic, pimelic, suberic, azelaic, sebacic, brassylic, thapsic, octadecanedioic, ether diacids such as diglycolic acid, diacids containing alicyclic rings such as 1,4-cyclohexanedicarboxylic acid and 4,4'-dicyclohexyl-1,1'-dicarboxylic acid, and aromatic diacids such as phthalic acid, isophthalic acid, terephthalic acid, methylphthalic acid, chlorophthalic acid, diphenyl-2,2'-dicarboxylic acid, diphenyl-4,4'-dicarboxylic acid, 1,4-naphthalene dicarboxylic acid, 1,8-naphthalenedicarboxylic acid, diphenylmethane - 2,2' - dicarboxylic acid, diphenylmethane-3,3'-dicarboxylic acid and diphenylmethane-4,4'-dicarboxylic acid, and the like.

Representative diols $D(OH)_2$ useful herein include ethylene glycol, 1,2-propylene glycol, 1,2-butylene glycol, trimethylene glycol, tetramethylene glycol, pentamethylene glycol, hexamethylene glycol, 2-ethyl-1,3-butylene glycol, octamethylene glycol, 2-ethyl-1,3-hexanediol, decamethylene glycol, dodecamethylene glycol, tetradecamethylene glycol, hexadecamethylene glycol and octadecamethylene glycol, and diols containing ether groups such as diethylene glycol, triethylene glycol, tetraethylene glycol, octaethylene glycol, decaethylene glycol, and the corresponding polytetramethylene glycols of structure $H{+}O(CH_2)_4{+}_nOH$ where $n$ is from two to seven or more. The diol $D(OH)_2$ may also contain alicyclic rings, such as 1,4-cyclohexanediol, 1,4-bis(hydroxymethyl)cyclohexane, 4,4'-dihydroxy-1,1'-dicyclohexyl and the like. The lower glycols such as ethylene glycol, propylene glycol and the like are preferred.

The molar amount of diol or diols and acid in the polymeric product will be approximately equal. When just $[R_f—R'—]_aCH_{2-a}(CH_2OH)_2$ and $A(CO_2H)_2$ are condensed together, the polymers contain the repeating unit:

(3) 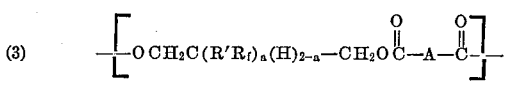

When mixtures of diols are used the polymer also contains the repeating unit:

(4) 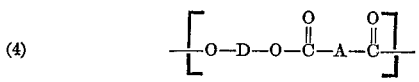

Random arrangement probably occurs. One possible grouping is:

(5) 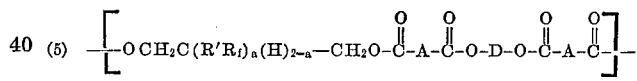

In every case, it is readily seen that one mole or diacid $A(CO_2H)_2$ is required for each mole of diol or diols and vice-versa. By using an excess of diol or diacid, one can tend to control whether the polymer chains are terminated by carboxyl or hydroxyl groups.

These polyester condensation polymers are prepared by techniques well known for the manufacture of polyesters. Ordinarily, mixtures of the diols and esters of the diacids are heated together in the presence of an acidic transesterification catalyst such as antimony trioxide, tetraisopropyl titanate, toluenesulfonic acid, and the like. Volatile alcohol esters such as methyl or ethyl are generally preferred, i.e., $A(CO_2CH_3)_2$ or $A(CO_2C_2H_5)_2$, and the heating is carried out at temperatures sufficient to cause the volatile alcohol of such ester to distill. In most instances, temperatures in the range of 150° C. to 320° C. are sufficient. Usually, a reduced pressure is applied to the reaction vessel in the latter stages of the reaction, along with higher temperatures, to keep the mass fluid and to remove last traces of volatile alcohol. When no further polymerization occurs, generally as judged by no further increase in viscosity of the reaction mass, the polymer is collected and cooled.

When a mixture of $[R_f—R'—]_aCH_{2-a}(CH_2OH)_2$ and $D(OH)_2$ is being used to polymerize with $A(CO_2H)_2$, special considerations apply to the relative amounts of the two diols used. An excess of the more volatile diol (often but not necessarily $D(OH)_2$) may be added. The mole ratio of two diols in the final product is controlled by the mole ratio of less volatile diol to diacid in the original mixture. For example, if the original reaction mixture contains one mole $R_f—R'—CH(CH_2OH)_2$, two moles $A(CO_2CH_3)_2$ and three moles ethylene glycol, then when reaction with the diester is initially complete, theoretically the two species $A(CO_2CH_2CH_2OH)_2$ and $$HOCH_2CH_2O_2C-A-CO_2CH(R'R_f)CH_2OH$$

could exist in the mixture. The two further equilibrium reactions a and b below could occur on further heating.

(a) $A(CO_2CH_2CH_2OH)_2 + HOCH_2CH_2O_2C-A$
$-CO_2CH_2CH(R'R_f)CH_2OH \rightleftharpoons HOCH_2CH_2O_2C-A$
$-CO_2CH_2CH(R'R_f)CH_2O_2C-ACO_2CH_2CH_2OH$
$+ HOCH_2CH_2OH$ (b) $A(CO_2CH_2CH_2OH)_2 + HOCH_2CH_2O_2C-A$
$-CO_2CH_2CH(R'R_f)CH_2OH \rightleftharpoons HOCH_2CH_2O_2C$
$-A-CO_2CH_2CH_2O_2C-A-CO_2CH_2CH_2OH$
$+ R_f-R'-CH(CH_2OH)_2$ Since ethylene glycol is more volatile than the glycol $R_fR'-CH(CH_2OH)_2$, reaction (a) is driven to the right by distillation of ethylene glycol in preference to driving reaction (b) to the right. Further condensation of the product of reaction (a) with loss of ethylene glycol eventually leads to a product containing essentially equimolar amounts of the two glycols. Similarly, if the initial mixture were in the molar ratio $$3R_f-R'-CH(CH_2OH)_2/3HOCH_2CH_2OH/4A(CO_2CH_3)_2$$

the final polymer would be in the ratio $$3R_f-R'-CH(CH_2OH)_2/HOCH_2CH_2OH/4A(CO_2H)_2$$

Or, if the initial ratio were $$R_f-R'-CH(CH_2OH)_2/6HOCH_2CH_2OH/4A(CO_2CH_3)$$

the final ratio would be $$R_f-R'-CH(CH_2OH)_2/3HOCH_2CH_2OH/4A(CO_2H)_2$$

(2) POLYESTERS DERIVED FROM $(R_f-R'\!\!\mbox{-}\!\!)_aCH_{2-a}(COOH)_2$ AND DIOLS These polymers are derived from the acid form of the monomers of Formula 1 and diols of the formula $E(OH)_2$ wherein E is defined the same as D in Section C-1 above, or is a halogenated diol of the formula $$HOCH_2(CF_2)_nCH_2OH$$

wherein n is a cardinal number of from 2 through 8. Representative diols $D(OH)_2$ have been listed above and representative halogenated diols are described in McBee et al., J. Amer. Chem. Soc., 74, 444 (1952).

These polyesters will contain the repeating unit broadly (5) 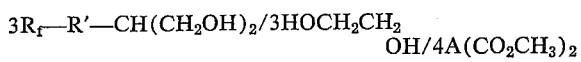

and, more narrowly, the units (6) 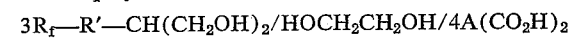 and (7) 

These polyesters are prepared by heating approximately equimolar quantities of a lower alkyl ester (methyl, ethyl, propyl, butyl) of the acid $[R_f-R'-]_aCH_{2-a}(CO_2H)_2$ and the diol $E(OH)_2$ in the presence of the same type of acid catalyst and conditions as described in Section C-1. When the diol $E(OH)_2$ is a mixture of two diols (or more), the comments in Section C-1 above concerning relative volatility of the individual diols and molar ratios in the product polymer applies here also.

(3) THE EXAMPLES

The following examples serve only to illustrate the polymers of this invention in greater detail, and are not to be considered as limiting the described invention in any manner.

The following Examples 1–6 illustrate the preparation of the malonic acid and ester monomers used to prepare polymers of this invention:

EXAMPLE 1

Sodium metal (9.7 g.) was added to 311 g. dry tertbutanol in an anhydrous system. After heating under reflux for 24 hours, reaction was not complete. 48 ml. dry methanol were added, causing the remaining sodium to react within one hour. Approximately 75 ml. of liquids were distilled from the mixture. The mixture was cooled to 50° C. and 69 g. of freshly distilled diethyl malonate were added dropwise over a six-minute period. Then 250 ml. of liquid were distilled from the mixture under a nitrogen atmosphere, the mixture was cooled to 65° C. and 199 g. of $F(CF_2)_6CH_2CH_2I$ were added dropwise under a nitrogen atmosphere in ten minutes. The resulting mixture was heated under reflux for 2.5 hours during which time considerable white solids precipitated. Then about 250 ml. of liquid were distilled from the mixture at which point the pot temperature reached 120° C. The residue was cooled, ether was added and the solution was extracted with a few ml. of 5% hydrochloric acid. The aqueous layer was made more strongly acidic and extracted with ether. The combined ether solutions were washed with water and dried over anh. sodium sulfate. Distillation under reduced pressure gave 15.3 g. of impure starting material $$F(CF_2)_6CH_2CH_2I$$

B.P. 74.5–90° C./23 mm., and 108.4 g. of mixed methyl and ethyl esters of $F(CF_2)_6CH_2CH_2CH(CO_2H)_2$ (3,3,4,4,5,5,6,6,7,7,8,8,8 - tridecafluorooctylmalonic acid) $n_D^{20}$ 1.3619–1.3481, 52.5% yield.

EXAMPLE 2

The mixture of methyl and ethyl esters of $$F(CF_2)_6CH_2CH_2CH(CO_2H)_2$$

(98.2 g.) obtained in Example 1 was added dropwise over a period of 11 minutes to an agitated solution of 66 g. of 85% potassium hydroxide in 70 ml. water at 63–73° C. under a nitrogen atmosphere. The mixture was then heated under reflux for one hour, then the resulting alcohols were allowed to distill from the system. Water (50 ml.) was added at 19° C., then a mixture of 150 ml. concd. hydrochloric acid and 50 g. ice dropwise, resulting in a thick, cream-colored paste. A further 100 ml. water, then a small portion of ether were added, resulting in a two phase system. The mixture was extracted three times with ether and the combined ether extracts were dried over calcium sulfate. After the solids were removed by filtration and the ether was evaporated, the resulting yellowish solid was recrystallized from anisole. Three crops of crystals of $F(CF_2)_6CH_2CH_2CH(CO_2H)_2$ were obtained as follows.

(I) M.P. 108–109° C., 53.7 g., white, neutral equivalent 225.

Analysis.—Calcd. for $C_{11}H_7F_{13}O_4$ (percent): C, 29.32; H, 1.56; F, 54.90; mol. weight, 450. Found (percent): C, 29.45; H, 1.60; F, 55.45; mole weight, 450.

(II) M.P. 98–100° C., 15.7 g. white, neutral equivalent 236, mole weight 472.

(III) M.P. 96–100° C., 2.7 g., white, neutral equivalent 238, mole weight 476.

Overall yield of $F(CF_2)_6CH_2CH_2CH(CO_2H)_2$ 72.1 g., 80.1%.

A yellowish residue from the above recrystallizations was distilled in a microstill, giving 2.8 g. of material, B.P. 94–98° C./0.6–0.8 mm., which solidified on cooling. Recrystallization from a mixed trichlorotrifluoroethane-petroleum ether solution at carbon ice temperature gave $F(CF_2)_6CH_2CH_2CH_2CO_2H$, M.P. 54–55° C.

Analysis.—Calcd. for $C_{10}H_7F_{13}O_2$ (percent): C, 29.56; H, 1.72; F, 60.84; mole weight 406. Found (percent): C, 29.25; H, 1.70; F, 60.45; mole weight 407. The acid possessed strong I.R. peaks at 3.2–3.8μ and 5.83μ (Nujol mull) or 3.0–3.57μ and 5.81μ (chloroform solution), indicating —OH and carbonyl. The tridecafluorodecanoic acid resulted from decarboxylation of the malonic acid.

EXAMPLE 3

Example 1 was repeated by reacting 23 g. of sodium metal with 604 g. purified tert-butanol. In this case, the mixture was heated intermittently until the sodium dissolved, without adding methanol as in Example 1. Then 168 g. of distilled diethyl malonate were added dropwise (one hour) at 34–72° C. and the resulting mixture was heated at 70–75° C. for one-half hour. Then 474 g. of $F(CF_2)_6CH_2CH_2I$ were added at 70–75° C. (20 minutes) and the resulting mixture was heated under nitrogen for 20 hours at 75° C. The mixture was then distilled at atmospheric pressure until the pot temperature reached 120° C., 740 ml. of distillate collected.

The residue was cooled to 21° C. and 200 ml. water were added. The mixture was extracted with ether and the combined ether extract dried over sodium sulfate. The ether was evaporated and the residue distilled under reduced pressure, giving 58.2 g. of starting materials, B.P. 44°/10 mm. to 92°/1.05 mm., 332.6 g. of primarily the diethyl ester (containing 5–9% tert-butyl ester groups) of $F(CF_2)_6CH_2CH_2CH(CO_2H)_2$, yield 74%, B.P. 95° C./ 1.0 mm.–105° C./0.30 mm., $n_D^{20}$ 1.3602–1.3567, and 79.2 g. of primarily diethyl ester of $$[F(CF_2)_6CH_2CH_2]_2C(CO_2H)_2,$$

B.P. 90° C./0.21 mm.–128° C./0.30 mm., $n_D^{20}$ 1.3548–1.3478, yield 15%.

EXAMPLE 4

Example 3 was repeated replacing the 474 g. of $F(CF_2)_6CH_2CH_2I$ with 574 g. of $F(CF_2)_8CH_2CH_2I$. After heating and isolating as in Example 3, a 75.5% yield of $F(CF_2)_8CH_2CH_2CH(CO_2C_2H_5)_2$ was obtained, B.P. 107–108° C./0.4 mm.

*Analysis.*—Calcd. for $C_{17}H_{15}O_4F_{17}$ (percent): D, 33.7; H, 2.5; F, 53.36. Found (percent): C, 33.5; H, 2.4; F, 53.5.

EXAMPLE 5

Example 3 was repeated replacing the 474 g. of $F(CF_2)_6CH_2CH_2I$ with 674 g. of $F(CF_2)_{10}CH_2CH_2I$. After heating and isolating as in Example 3, a 77% yield of $F(CF_2)_{10}CH_2CH_2CH(CO_2C_2H_5)_2$ was obtained, B.P. 122–123° C./0.35 mm.

*Analysis.*—Calcd. for $C_{19}H_{15}O_4F_{21}$ (percent): C, 32.3; H, 2.1; F, 56.5. Found (percent): C, 32.3; H, 2.2; F, 56.5.

EXAMPLE 6

Example 3 was repeated replacing the 474 g. of $F(CF_2)_6CH_2CH_2I$ with 644 g. of $$F(CF_2)_6(CH_2)_{11}-O_3S-C_7H_7$$

(tolylate ester of $F(CF_2)_6(CH_2)_{11}OH$). After heating and isolating as before, a 95% yield of $$F(CF_2)_6(CH_2)_{11}CH(CO_2C_2H_5)_2$$

was obtained; B.P. 136–138° C./0.05 mm.

*Analysis.*—Calcd. for $C_{24}H_{33}O_4F_{13}$ (percent): C, 45.6; H, 5.2; F, 39.1. Found (percent): C, 46.0; H, 5.4; F, 39.4.

Employing the procedures described in Examples 1–6, any of the malonic esters and acids described in Section A herein can be prepared by replacing the reactants and bases with others listed therein.

The following Examples 7–11 illustrate the preparation of the 1,3-propanediol monomers used to prepare polymers of this invention:

EXAMPLE 7

A solution of 51 g. of $F(CF_2)_6CH_2CH_2CH(CO_2C_2H_5)_2$ in 200 ml. dry purified diethyl ether was added dropwise to a stirred slurry of 7.6 g. lithium aluminum hydride in 500 ml. dry purified ether under nitrogen. The addition took one hour, while maintaining the mass under gentle reflux. After addition was complete, the mass was heated under reflux for two hours. Ethyl acetate (30 ml.) was added dropwise to the cooled mixture followed by 400 g. of 10% aqueous sulfuric acid. After stirring for a short time, the resulting mixture was separated and the aqueous layer extracted with ether. The combined ether layers were dried over anh. sodium sulfate. Evaporation of the ether gave 33.1 g. of crude white crystals, M.P. 55–65° C. and 6.1 g. of liquid. Distillation of the liquid under reduced pressure indicated it to be a mixture of starting ester and a substance which appeared to be

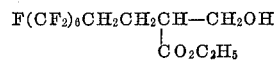

due to incomplete reduction.

The solids were recrystallized from an 80/20 (by volume) mixture of benzene/acetonitrile, giving 29.4 g. of $F(CF_2)_6CH_2CH_2CH(CH_2OH)_2$ [2-(3',3',4',4',5',5',- 6',6',7',7',8',8',8', - tridecafluorooctyl) - 1,3 - propanediol], M.P. 72.5–73.5° C. The product may also be recrystallized from chloroform.

*Analysis.*—Calcd. for $C_{11}H_{11}F_{13}O_2$ (percent): C, 31.29; H, 2.61; F, 58.52; O, 7.58. Found (percent): C, 31.2; H, 2.6; F, 58.5.

The nuclear magnetic resonance spectra in the Hl and $F^{19}$ regions agreed with the assigned structure.

EXAMPLE 8

A solution of 85.2 g. of $$[F(CF_2)_6CH_2CH_2]_2C(CO_2C_2H_2)_2$$

in 200 ml. dry and purified diethyl ether was added dropwise to a stirred slurry of 9.5 g. lithium aluminum hydride in 500 ml. dry ether under nitrogen. The addition took 82 minutes, keeping the mass at gentle reflux. After addition, the mass was heated under reflux for 4 hours.

After cooling to 18° C., 500 g. of 10% sulfuric acid were added dropwise to the stirred slurry. The resulting mixture was separated and the aqueous layer extracted with ether. The combined ether solutions were dried over sodium sulfate. Evaporation of the ether and recrystallization of the resulting crude product from chloroform gave the following:

Crop 1, 66.2 g., M.P. 77–77.5° C., white crystals, strong infrared peak at $3.01\mu$.

Crop 2, 2.7 g., M.P. 62–65° C., off-white crystals, medium strong infrared peak $3.01\mu$, trace peak at $5.85\mu$ due to ester carbonyl.

Residue: Viscous amber liquid, infrared spectrum containing both hydroxyl and carbonyl peaks.

*Analysis* (Crop 1).—Calcd. for $C_{19}H_{14}F_{26}O_2$ (percent): C, 29.7; H, 1.8; F, 64.3; O, 4.2. Found (percent): C, 29.5; H, 1.8; F, 64.2.

Thus, Crop 1 was $[F(CF_2)_6CH_2CH_2]_2C(CH_2OH)_2$ [2,2 - bis(3',3',4',4',5',5',6',6',7',7',8',8',8' - tridecafluorooctyl) - 1,3-propanediol], yield (Crop 1 only) 86.2%.

EXAMPLE 9

Using the procedure of Example 7, $$n-C_8F_{17}CH_2CH_2CH(CO_2C_2H_5)_2$$

was caused to react with lithium aluminum hydride in a molar ratio of one mole ester to two moles hydride, giving $n-C_8F_{17}CH_2CH_2CH(CH_2OH)_2$ in 78% yield, M.P. 111–114° C. Infra-red analysis indicated freedom from ester groups.

*Analysis.*—Calcd. for $C_{13}H_{11}O_2F_{17}$ (percent): C, 29.9; H, 2.1; F, 61.9. Found (percent): C, 29.9; H, 2.1, F, 59.3.

EXAMPLE 10

In the same manner as Example 7, $$n-C_{10}F_{21}CH_2CH_2CH(CO_2C_2H_5)_2$$

was caused to react with lithium aluminum hydride in a ½ mole ratio, giving n—$C_{10}F_{21}CH_2CH_2CH(CH_2OH)_2$ in 90% yield, M.P. 141–143° C.

*Analysis.*—Calcd. for $C_{15}H_{11}O_2F_{21}$ (percent): C, 28.9; H, 1.8; F, 64.1. Found (percent): C, 29.2; H, 1.8; F, 68.8.

EXAMPLE 11

In the same manner as Example 7, n—$C_6F_{13}(CH_2)_{11}CH(CO_2C_2H_5)_2$ was caused to react with lithium aluminum hydride in a ½ mole ratio, giving n—$C_6F_{13}(CH_2)_{11}CH(CH_2OH)_2$ in 81% yield, M.P. 90–91° C. after recrystallization from chloroform.

*Analysis.*—Calcd. for $C_{20}H_{29}O_2F_{13}$ (percent): C, 43.8; H, 5.3; F, 45.1. Found (percent): C, 44.2; H, 5.4; F, 43.6.

Using the above procedures of Examples 7–11, any malonic ester $[R_f—R'—]_aCH_{2-a}(CO_2R)_2$ described in Section A herein may be reduced to the corresponding 1,3-glycol $[R_f—R'—]_aCH_{2-a}(CH_2OH)_2$.

The following Examples 12–31 illustrate the preparation of the polymers of this invention:

EXAMPLE 12

A mixture of 5.1 g. $F(CF_2)_6CH_2CH_2CH(CO_2C_2H_5)_2$, 4.22 g. $F(CF_2)_6CH_2CH_2CH(CH_2OH)_2$ and 0.00284 g. tetraisopropyl titanate was heated at 200° C. for 2.5 hrs. under nitrogen, allowing ethanol to distil as it forms from the melt. After 87% of the theoretical amount of ethanol had distilled, the system was placed under vacuum (0.3 mm.) and heated to 300° C. A substance began to distil so the system was cooled under nitrogen, when solidification occurred.

The resulting product melted completely by 55° C. The infrared spectrum showed a trace peak at 2.95μ due to —OH and a strong ester carbonyl peak at 5.73μ.

Pieces of filter paper and cotton poplin were dipped into an ethyl acetate solution of the product, then allowed to air dry. Drops of "Nujol" purified petroleum oil on the surfaces of the paper and cloth samples did not penetrate, demonstrating that the product had rendered the paper and cloth oil repellent.

EXAMPLE 13

A mixture of 68.0 parts n—$C_6F_{13}CH_2CH_2CH(CH_2OH)_2$ and 15.5 parts dimethyl terephthalate, 0.006 part antimony trioxide, 0.025 part calcium acetate monohydrate and 0.20 part methyl benzoate was heated under anhydrous conditions and a nitrogen atmosphere at 120–220° C. for five hours. During this time, 77% of the expected methanol distilled from the mass. Heating was continued for 4.5 hours at 220–285° C. The excess diol and remaining methanol were removed at 0.45 mm. pressure.

The polymer

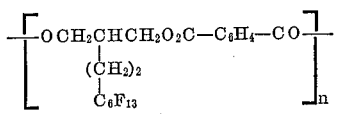

had an inherent viscosity of 0.14 as a 0.5% solution in chloroform at 30° C.

*Analysis.*—Calcd. for $C_{19}H_{13}O_4F_{13}$ (percent): C, 40.2; H, 2.4; F, 45.6. Found (percent): C, 41.2, 41.3; H, 2.4, 2.4; F, 45.1, 45.1.

EXAMPLE 14

A mixture of 17.0 parts n—$C_6F_{13}CH_2CH_2CH(CH_2OH)_2$ 7.5 parts ethylene glycol, 15.5 parts dimethyl terephthalate (mole ratio $C_6F_{13}CH_2CH_2CH(CH_2OH)_2$/ethylene glycol=0.35/1, mole ratio total diols/diester=2/1), 0.006 part antimony trioxide and 0.025 part calcium acetate monohydrate was placed in reaction vessel fitted for agitation, maintaining anhydrous conditions and a nitrogen atmosphere and application of vacuum. After purging for 30 minutes with nitrogen, the mass was heated at 185° C. for 3 hours, then at 200° C. for 3 hours. During this time, 69% of the expected methanol distilled from the mass. Additional heating for 2 hours at 220° C. gave an additional 23% of the methanol (total 92%). Heating was continued for 2.5 hours while the temperature was increased to 275° C. and the pressure reduced to 14 mm. Finally, the pressure was reduced to 0.05 mm. and heating was continued at 275–280° C. for 2 hours, at which time no further apparent increase in viscosity was occurring. The polymer was then allowed to cool.

The polymer was found to consist of n—$C_6F_{13}CH_2CH_2CH(CH_2OH)_2$ and $HOCH_2CH_2OH$ in the mole ratio 1/1 polymerized with terephthalic acid.

*Analysis.*—Calcd. for $C_{29}H_{21}O_8F_{13}$ (percent): C, 46.8; H, 2.8; F, 33.2. Found (percent): C, 46.9, 47.1; H, 3.0, 3.0; F, 33.2, 33.2.

The polymer had an inherent viscosity of 0.34 as a 0.5% solution in chloroform at 30° C. Inherent viscosity is determined according to the equation $$\text{Inh. Visc.} = \frac{1}{C} \ln \left[ \frac{N}{N_0} \right]$$

where C is the concentration of polymer in grams per 100 ml. of solution, N is the measured viscosity of the solution and $N_0$ is the measured viscosity of the solvent.

EXAMPLE 15

Example 14 was repeated under similar conditions, giving a polymer of inherent viscosity 0.17 as a 0.5% solution in chloroform at 30° C.

*Analysis.*—Found (percent): C, 47.8, 47.7; H, 3.1, 3.1; F, 33.0, 33.1.

EXAMPLE 16

Example 14 was repeated under similar conditions giving a polymer of inherent viscosity 0.22 as a 0.5% solution in chloroform at 30° C.

*Analysis.*—Found (percent): C, 47.7, 47.6; H, 2.8, 2.8; F, 32.0.

EXAMPLE 17

Example 14 was repeated using 34.0 parts n—$C_6F_{13}CH_2CH_2CH(CH_2OH)_2$ 5.0 parts ethylene glycol and 15.5 parts dimethyl terephthalate (mole ratio $C_6F_{13}CH_2CH_2CH(CH_2OH)_2/HOCH_2CH_2OH=1/1$)

The heating was carried out as follows: 180–187° C. for 2.75 hours, 220–226° C. for 2.5 hours, collecting 80% of the expected methanol. Heating was continued for 2 hours at 245° C. while slowly reducing the pressure to 0.4 mm. Heating was continued at this pressure for 2 hours at 245–255° C., then 2.5 hours at 255–285° C.

The resulting polymer had an inherent viscosity of 0.03 as an 0.18% solution in chloroform. The resulting polymer was found to contain $C_6F_{13}CH_2CH_2CH(CH_2OH)_2$ and $HOCH_2CH_2OH$ in the mole ratio of 7/3.

*Analysis.*—Calcd. for $C_{163}H_{115}O_{40}F_{91}$ (percent): C, 43.2; H, 2.7; F, 39.6. Found (percent): C, 43.7, 43.6; H, 2.7, 2.5; F, 40.8.

EXAMPLE 18

Example 14 was repeated using 20.9 parts n—$C_8F_{17}CH_2CH_2CH(CH_2OH)_2$ 7.5 parts ethylene glycol (molar ratio=1/3), 15.5 parts dimethyl terephthalate, 0.006 part antimony trioxide and 0.025 part calcium acetate monohydrate. Heating was carried out as follows: 185° C., 4.5 hours, 210° C., 3.5 hours, collecting 71% of the expected methanol. The pressure was reduced slowly during 2 hours to 250 mm. while heating at 210° C. The temperature over the next 90 min. was increased to 268° C. and the pressure was reduced to 0.04 mm. Heating was continued for 1.5 hours at 270° C. and 0.025 mm.

The resulting polymer contained the two glycols in a 1/1 molar ratio and had an inherent viscosity of 0.41 as a 0.5% solution in chloroform at 30° C.

*Analysis.*—Calcd. for $C_{31}H_{21}O_8F_{17}$ (percent): C, 44.2; H, 2.3; F, 38.4. Found (percent): C, 45.2, 45.1; H, 3.4, 3.5; F, 38.1, 38.1.

EXAMPLE 19

Example 14 was repeated using 24.9 parts

n—$C_{10}F_{21}CH_2CH_2CH(CH_2OH)_2$ 7.5 parts ethylene glycol (molar ratio=1/3), 15.5 parts dimethyl terephthalate, 0.006 part antimony trioxide and 0.0025 part calcium acetate monohydrate. Heating was carried out as follows: 160–185° C.—5 hours, 185–200° C.—2 hours. About 79% of expected methanol was collected. During one hour the pressure was reduced to 75 mm. and the temperature increased to 265° C. The pressure was further reduced to 0.05 mm. and heating was continued for one hour at 265° C. and one hour at 275° C.

The resulting polymer contained the two glycols in the molar ratio of 1/1.

EXAMPLE 20

Example 14 was repeated using 11.0 parts n—$C_6F_{13}(CH_2)_{11}CH(CH_2OH)_2$ 3.7 parts ethylene glycol (molar ratio 1/3), 7.8 parts dimethyl terephthalate, 0.006 part antimony trioxide and 0.025 part calcium acetate monohydrate. Heating was carried out as follows: 160–194° C.—6 hours, giving 84% of theoretical methanol, the temperature was increased to 258° C. and the pressure reduced to 1.0 mm. over one hour. Heating was continued at 258–270° C./1.0 mm. for one hour.

The resulting polymer contained the two glycols in a 1/1 molar ratio.

EXAMPLE 21

Example 14 was repeated using 30.7 parts

[n—$C_6F_{13}CH_2CH_2]_2C(CH_2OH)_2$ 7.5 parts ethylene glycol, 15.5 parts dimethyl terephthalate, 0.006 part antimony trioxide and 0.025 part calcium acetate monohydrate. Heating was carried out as follows: 3 hours—185° C., 3 hours—200–204° C., 2.5 hours at 220–250° C., giving 62% of expected methanol. The pressure was reduced to 0.1 mm. Hg during the next 3 hours while increasing the temperature to 283° C. Heating was continued at 283° C./0.1–0.2 mm. for 2 hours.

The product contained the two glycols in a 1/1 molar ratio and had an inherent viscosity of 0.24 as a 0.5% solution in chloroform at 30° C.

*Analysis.*—Calcd. for $C_{37}H_{24}O_8F_{26}$ (percent): C, 40.7; H, 2.2; F, 45.3. Found (percent): C, 42.2, 42.7; H, 2.6, 2.7; F, 44.8.

EXAMPLE 22

(A) A mixture of 17.0 parts

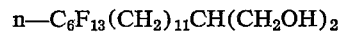
n—$C_6F_{13}CH_2CH_2CH(CH_2OH)_2$ 7.5 parts ethylene glycol, 13.6 parts dimethyl terephthalate, 2.3 parts dimethyl sebacate, 0.006 part antimony trioxide and 0.025 part calcium acetate was heated as follows: 186–205° C.—4 hours giving 86% of expected methanol, pressure reduced to 0.1 mm.—2.5 hours, temperature increased to 265° C., heated for 3 hours.

The resulting polymer contained the two glycols in the molar ratio 1/1 and the two acids in the molar ratio terephthalic/sebacic=7/1. It has an inherent viscosity of 0.23 as a 0.5% solution in chloroform at 30° C.

*Analysis.*—Calcd. for $C_{118}H_{96}O_{32}F_{52}$ (percent): C, 47.0; H, 3.2; F, 32.8. Found (percent): C, 48.2, 48.0; H, 3.5, 3.5; F, 32.3.

(B) The procedure of part A was repeated using 17.0 part n—$C_6F_{13}CH_2CH_2CH(CH_2OH)_2$, 7.5 parts ethylene glycol, 11.6 parts dimethyl terephthalate and 4.6 parts dimethyl sebacate.

The resulting polymer contained the two glycols and the two acids in 1/1 molar ratios.

EXAMPLE 23

In a manner similar to the proceeding examples, a copolymer of n—$C_6F_{13}CH_2CH_2CH(CH_2OH)_2$ and dimethyl 4,4'-bibenzoate was prepared.

EXAMPLE 24

Using the procedure of example 14, a mixture of 17.0 parts n—$C_6F_{13}CH_2CH_2CH(CH_2OH)_2$, 7.5 parts ethylene glycol, 21.6 parts dimethyl 4,4'-bibenzoate, 0.010 part antimony trioxide and 0.030 part calcium acetate monoacetate was heated as follows: 7.5 hours—185–225° C., pressure reduced to 0.025 mm./3.5 hours, temperature increased to 270° C. Heating at 220° C./0.025 mm. continued one hour.

The resulting polymer contained the two glycols in an equimolar ratio.

EXAMPLE 25

Using the procedure of Example 14, a mixture of 34.0 parts n—$C_6F_{13}CH_2CH_2CH(CH_2OH)_2$, 5.0 parts ethylene glycol, 21.6 parts dimethyl 4,4'-bibenzoate, 0.006 part antimony trioxide and 0.025 part calcium acetate was heated as follows: 7 hours—220° C., 86% methanol, pressure reduced to 0.7 mm., heated at 225° C./0.7–1.0 mm. for 4.5 hours.

The resulting polymer contained the glycols in the molar ratio 7

$C_6F_{13}CH_2CH_2CH(CH_2OH)_2$/3 $HOCH_2CH_2OH$

It had an inherent viscosity of 0.13 as a 0.5% solution in chloroform at 30° C.

*Analysis.*—Calcd. for $C_{223}H_{155}O_{40}F_{91}$ (percent): C, 51.4; H, 3.0; F, 33.2. Found (percent): C, 51.1, 51.3; H, 5.1, 5.6; F, 33.7.

EXAMPLE 26

Using the procedure of Example 14, a mixture of 20.9 parts n—$C_8F_{17}CH_2CH_2CH(CH_2OH)_2$, 7.5 parts ethylene glycol, 21.6 parts dimethyl 4,4'-bibenzoate, 0.010 part antimony trioxide and 0.030 part calcium acetate monohydrate was heated as follows: 185° C.—18 hours, 185–200° C.—5 hours, 235–245° C.—4 hours, 235° C./230 mm.—1.5 hours, 270° C./0.1 mm.— 3 hours.

The resulting polymer contained the two glycols in an equimolar ratio.

EXAMPLE 27

Using the procedure of Example 14, a mixture of 30.8 parts [n—$C_6F_{13}CH_2CH_2]_2C(CH_2OH)_2$, 2.48 parts ethylene glycol, 10.8 parts dimethyl 4,4'-bibenzoate, 0.010 part antimony trioxide and 0.030 part calcium acetate was heated as follows: 180–195° C.—4 hours, 195–220° C.—20 hours, 225–260° C./760–0.4 mm.—2 hours, 260–271° C./0.4 mm.-0.025 mm.—2.5 hours.

The resulting polymer contained the two glycols in an equimolar ratio.

EXAMPLE 28

Using the procedure of Example 14, a mixture of 17.0 parts n—$C_6F_{13}CH_2CH_2CH(CH_2OH)_2$, 7.5 parts ethylene glycol, 15.5 parts dimethyl isophthalate, 0.006 part antimony trioxide and 0.025 part calcium acetate monohydrate was heated as follows: 180° C.—3 hours, 220° C.—4 hours, 220–250° C.—1 hour, 250° C./760 mm.–

0.3 mm.—3 hours, 250–288° C./0.2–0.03 mm.—1.5 hours.

The resulting polymer contained the two glycols in an equimolar ratio. It had an intrinsic viscosity of 0.32 as a 0.5% solution in chloroform at 30° C.

*Analysis.*—Calcd. for $C_{29}H_{21}O_8F_{13}$ (percent): C, 46.8; H, 2.8; F, 33.2. Found (percent): C, 46.7, 46.9; H, 2.8, 2.7; F, 33.3.

EXAMPLE 29

The procedure of Example 14 was repeated using 17.0 parts n—$C_6F_{13}CH_2CH_2CH(CH_2OH)_2$, 7.5 parts ethylene glycol, 11.6 parts dimethyl isophthalate, 2.0 parts dimethyl maleate, 0.006 parts antimony trioxide and 0.025 part calcium acetate monohydrate. Heating was carried out as follows: 205–210° C.—4.5 hours, 197–208° C./20 mm.—3 hours, 208–209° C.—0.2–0.3 mm.

The resulting polymer contained the two glycols in an equimolar ratio and the two acids in the molar ratio 3 isophthalate/1 maleate.

EXAMPLE 30

Using the procedure of Example 14 a mixture of 16.9 parts of n—$C_6F_{13}CH_2CH_2CH(CH_2OH)_2$ and 7.5 parts of ethylene glycol, and 19.5 parts of dimethyl 1,4-naphthalenedicarboxylate, 0.006 part of antimony trioxide and 0.025 part of calcium acetate monohydrate was heated as follows: 17.5 hours at 185° C., 6 hours at 185–222° C., 2.5 hours at 222–260° C./760–2 mm., and 7.5 hours at 230–268° C./0.5–0.7 mm. The resulting polymer contained the glycols in an equimolar ratio.

EXAMPLE 31

Using the procedure of Example 14 a mixture of 16.9 parts of n—$C_6F_{13}CH_2CH_2CH(CH_2OH)_2$, and 14.2 parts of 1,6-hexanediol, and 15.5 parts of dimethyl terephthalate, and 0.006 part of antimony trioxide, and 0.025 part of calcium acetate monohydrate was heated as follows: 6 hours at 185–195° C., 11 hours at 200–226° C., 4 hours at 195° C./760–0.8 mm., 6.5 hours at 250–266° C./0.25–0.65 mm. The resulting polymer contained the glycols in an equimolar ratio.

By employing the proper reactants described in Section C–1 herein, any of the polymers disclosed in said Section C–1 can be prepared according to the procedures described in Examples 12–31 and especially Example 14.

By employing the proper reactants described in Section C–2 herein, any of the polymers described therein can be prepared by replacing the diol reactant of Example 12 with any of the diols described in Section C–2.

EXAMPLE 32

Solutions in chloroform of representative examples of the polymers prepared in the previous examples were applied to fabrics. After evaporation of the solvent, the fabrics were cured at 180° C. for three minutes. The fabrics were then evaluated for oil and water repellency. Water repellency was determined using test method 22–1952 of the American Association of Textile Chemists and Colourists (ASTM Method D–583–63). Oil repellency was determined using test method 118–1966T of the American Association of Textile Chemists and Colourists. Both tests are described in the Technical Manual, 1966, of the aforenamed Association. The results are shown below in the table.

TABLE I

| Example | Fabric | Percent OWF (a) | Repellencies-Initial Oil | Repellencies-Initial Water |
|---|---|---|---|---|
| 15 | 80 x 80 cotton | 1.8 | 2 | 70 |
| 15 | Same | 5.1 | 3 | 70 |
| 25 | do | 3 | 5 | 80 |
| 25 | do | 10 | 6 | 90 |
| 27 | "Dacron"/cotton Style 799-poplin | 0.5 | 5 | 100 |
| 27 | Same | 1.0 | 6 | 100 |
| 27 | do | 2.0 | 3 | 100 |

EXAMPLE 33

It has recently been shown by Johnson and Dettre ["Advances in Chemistry" Series No. 43, 112–135 (1964), J. Phys. Chem., 68, 1744 (1964), Ibid., 69, 1507 (1965)] that the usefulness of textile treating agents as oil and water repellent agents may be evaluated by measurements of contact angles of water and hexadecane on flat films of the polymers provided both advancing and receding contact angles are measured. In the capillary type system which exists in treated textiles, it is the advancing angles which controls spreading and wicking [Furmidge, J. Colloid. Sci., 17, 309 (1962), Berch et al., Textile Research Journal, 35, 252–260 (1965)]. Thus both oil and water repellency ratings are directly related to the advancing angles. The receding angles help predict whether or not droplets will release or be fully blotted off. The difference between the two angles is called contact angle hysteresis which is ideally as small as possible.

Measurements were carried out on representative polymers described hereinbefore with the results shown below. The sessile drop method described by Johnson and Dettre (loc. sit.) was used.

TABLE II

| | Contact angles | | | |
|---|---|---|---|---|
| | Water | | Hexadecane | |
| Example | Advancing | Receding | Advancing | Receding |
| 13 | 115 | 63 | 68 | 62 |
| 14 | 113 | 65 | 63 | 54 |
| 15 | 112 | 60 | 64 | 54 |
| 16 | 111 | 64 | 64 | 53 |
| 17 | 113 | 63 | 68 | 54 |
| 18 | 115 | 78 | 67 | 62 |
| 19 | 118 | 88 | 72 | 69 |
| 20 | 112 | 64 | 63 | 41 |
| 21 | 118 | 84 | 71 | 63 |
| 22A | 112 | 63 | 62 | 44 |
| 23 | 120 | 109 | 75 | 64 |
| 24 | 120 | 97 | 72 | 68 |
| 26 | 120 | 111 | 71 | 67 |
| 27 | 117 | 93 | 68 | 62 |
| 28 | 114 | 61 | 66 | 56 |
| 29 | 112 | 55 | | |

Examples 32 and 33, along with portions of Example 12 demonstrate the usefulness of the polymers of this invention. Most are oil- and/or water-repellent ingredients when applied to fabrics. In addition, some of the polymers can be drawn into fibers or filaments or can be cast from solution into self-supporting films.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A polyester comprising recurring units of the structural formula

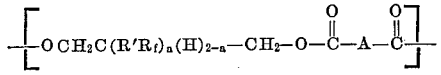

wherein $R_f$ is perfluoroalkyl of 4–20 carbon atoms; $R'$ is alkylene of 2–12 atoms; $a$ is the whole number 1 or 2; and A is alkylene or oxygen-interrupted alkylene of 0–16 carbon atoms, arylene or oxygene-interrupted arylene of 6–16 carbon atoms or $(R_f\text{-}R')_aCH_{2-a}{<}$.

2. The polyester of claim 1 wherein A is alkaline of 0–16 carbon atoms, arylene of 6–16 carbon atoms or $(R_f\text{-}R')_aCH_{2-a}{<}$.

3. The polyester of claim 1 which contains, additionally, units of the structural formula:

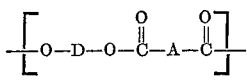

wherein D is alkylene or alicyclic alkyene of 2–18 carbon atoms, wherein the ratio of the recurring units of the structural formula

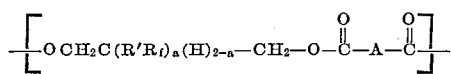

to the recurring units of the structural formula

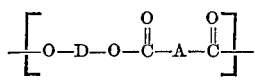

is at least 0.25 to 1.

4. A polyester comprising recurring units of the structureal formaula

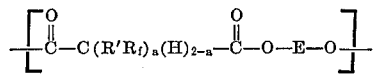

wherein $R_f$ is perfluoroalkyl of 4–20 carbon atoms; R' is alkylene of 2–12 carbon atoms; $a$ is the whole number 1 or 2; and E is alkylene of 2–18 carbon atoms or $$-CH_2(CF_2)_nCH_2-$$

wherein $n$ is a cardinal number of 2 through 8.

5. The polyester of claim 4 wherein E is alkylene of 2–18 carbon atoms.

References Cited
UNITED STATES PATENTS

| | | | |
|---|---|---|---|
| 3,145,222 | 8/1964 | Brace | 260—408 |
| 3,337,644 | 8/1967 | Drysdale | 260—633 |

WILLIAM H. SHORT, Primary Examiner

M. GOLDSTEIN, Assistant Examiner

U.S. Cl. X.R.

117—143, 161; 260—33.8, 48.5, 75

PO-1050
(5/69)

UNITED STATES PATENT OFFICE
CERTIFICATE OF CORRECTION

Patent No. 3,504,016      Dated March 31, 1970

Inventor(s) Kenneth C. Smeltz

It is certified that error appears in the above-identified patent and that said Letters Patent are hereby corrected as shown below:

Col. 14, line 65 (Claim 1) "oxygene" should read -- oxygen --.

Col. 14, line 67 (Claim 2) "alkaline" should read -- alkalene --.

SIGNED AND
SEALED

JUL 28 1970

(SEAL)
Attest:

Edward M. Fletcher, Jr.
Attesting Officer

WILLIAM E. SCHUYLER, JR.
Commissioner of Patents